March 13, 1956

D. C. ROGERS 2,737,871

WEED CUTTER BLADES FOR THE END
SECTIONS OF CULTIVATOR ROTORS

Filed May 29, 1950

INVENTOR

DOUGLAS CECIL ROGERS

By Young, Emery & Thompson
ATTYS.

United States Patent Office 2,737,871
Patented Mar. 13, 1956

2,737,871

WEED CUTTER BLADES FOR THE END SECTIONS OF CULTIVATOR ROTORS

Douglas Cecil Rogers, Glen Eden, Auckland, New Zealand

Application May 29, 1950, Serial No. 164,922

2 Claims. (Cl. 97—212)

This invention has been devised for use in conjunction with any of the well known rotary hoe, rotary cultivator or like type of cultivating implement in which the hoes, or discs, or tines, characteristic thereof are carried upon a spindle or rotor mounted to rotate within a draught frame.

In the use of these implements it is a common occurrence that as the machine is drawn over the ground surface, rubbish such as grass, loose wires and the like are caught up and wound round the ends of the rotors thereby causing choking of the bearings. Such rubbish is generally difficult to remove.

The object of the present invention is to provide against any such liability of such rubbish being wound upon the rotor, by causing it to be cut up when picked up in the turning of the rotor.

This object is given effect to by combining with the outer face of the rotor plate, one or more straight or curved blades disposed generally radially on such face and affixed thereto by being bolted or welded thereon, and by combining with the adjacent fixed frame member, a single blade extending on such member in radial alignment with the rotor plate. These are so associated that the blade or blades upon the rotor plate passes, or pass, across the cutting edge of the fixed blade on the frame, in a manner to make a shearing cut engagement between their edges. They act to cut up between them any matters which may be lifted on the surface of the said plate, and to drop it clear.

The blade on the frame member is so attached thereto that its position may be adjusted at will to regulate the relationship of its cutting edge to the edge or edges of the blade, or blades, upon the rotor plate and thus to insure of the necessary shearing effect between them.

The invention is illustrated in the accompanying drawings in which.

A represents the rotor disc of an ordinary rotary hoe and B the adjacent rotor support arm of the draught frame in which such rotor is mounted to rotate, by being mounted on a stay tube forming a spindle C, the end of which is journalled in the said frame member. The outer face of the said rotor disc is disposed adjacent to the surface of the frame member. In the operation of the hoe loose growths and rubbish lying in the course of the machine's travel are liable to be picked up by the rotor and become packed round the spindle in between the two faces. This liability exists in relation to other machines of like nature having a rotating member disposed face to face with a carrying frame member. The present invention is thus applicable for incorporation also in any such other machines.

Figure 1:
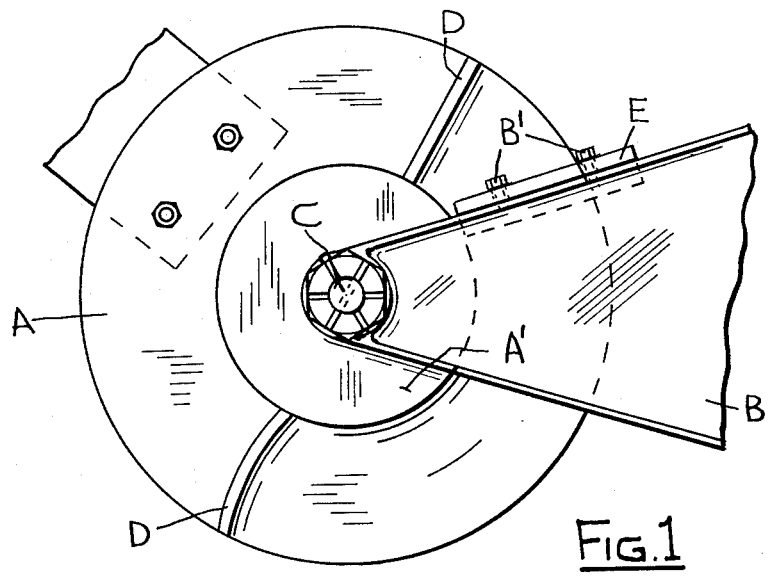
Figure 1 is an end elevation of a rotary hoe rotor and of the adjacent draught frame member showing the said cutting or shearing blades fixed thereon.
Figure 2:
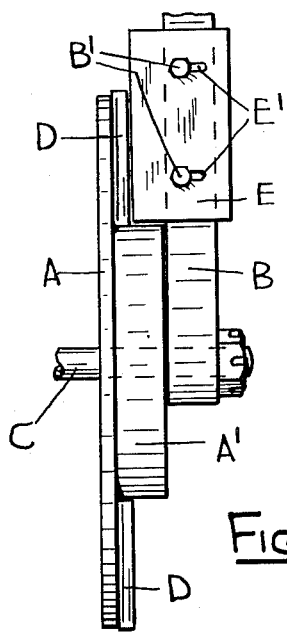
Figure 2 is a plan view of one end of the rotor and of the adjacent draught frame member.

Attached by welding, or other approved method, to the outer face of the rotor A radially outwardly of the drum A' on the side of rotor A are the shearing knife blades D, two of which are shown in the drawings, although one, or more than two, may be provided. Each of these blades is formed with a square cutting edge along its forward edge in the direction of the working rotation of the rotor and is disposed to extend in a general radial line thereon. The blades may be formed straight as shown in the one instance in Figure 1 or be formed to present a curved forward edge as shown in the other instance.

E is the flat blade secured to a suitable position upon the support arm B such that it extends in a general line extending at a slight angle to a line radial with the axis of the rotor A and has its inner edge disposed adjacent to the surface of such rotor so that the blade or blades D thereof passes or pass across such edge as the rotor turns such that the portions of the edges nearest the drum A' have met and have passed out of shearing engagement before the portions of the cutting edges toward the periphery of the disc A co-act. This edge is made as a cutting edge on its corner facing the direction of the rotor's rotation and the blade is so adjusted in its position that the rotor blade with its forward cutting edge makes a shearing cut, or scissor cut, engagement with the blade E as it passes across the latter's cutting edge.

Provision is made in the attachment of this blade E to the frame member for any lateral adjustment of its cutting edge in relation to that of the blade A may be made as required to regulate the shearing cut action of their engagement. For this purpose any approved manner of fastening may be employed. Suitable provision is shown in the drawings by which the blade plate is formed with two transverse slots E' and a stud bolt B' is provided for each slot to pass through it into the frame member B. With these bolts loosened the blade may be moved across within the limits of the length of the slots and then fixed at the required position by tightening the bolts.

The blades D and E are made of steel suitably hardened or tempered in accordance with the practices common in the art to adapt them for carrying out the general purposes of this invention.

I claim:

1. In rotary hoe and like implements embodying a rotor member mounted in a draught frame to rotate therein and in which such rotor member comprises a disc positioned adjacent to a member of such draught frame, and a drum on the side of the disc between the disc and the draught frame, the combination with such rotor member of at least one shearing blade secured to the face of said rotor member on the side thereof adjacent to the frame member to project laterally therefrom and disposed to extend radially from the periphery of the drum to the periphery of the disc, and with the said frame member, of a blade forming plate secured to it in a line extending at a slight angle to a line radial with such rotor axis outwardly from the periphery of the drum and having an inner shearing edge so disposed as to effect a shearing cut engagement with the blade upon the rotor member as it passes across such edge in the turning of the rotor member such that the portions of the edges nearest the drum have met and have passed out of shearing engagement before the portions of the cutting edges towards the periphery of the disc co-act.

2. A rotary hoe or like implement in accordance with claim 1, in which the said blade upon the draught frame member is secured to such member in a manner to allow its adjustment at will in its relationship to the blade on the rotor member.

References Cited in the file of this patent

UNITED STATES PATENTS 360,586    Hanson _____ Apr. 5, 1887

(Other references on following page)

UNITED STATES PATENTS

| | | |
|---|---|---|
| 499,744 | Lane | June 20, 1893 |
| 2,192,762 | Vincze | Mar. 5, 1940 |
| 2,403,271 | Erickson | July 2, 1946 |
| 2,480,419 | Patterson | Aug. 30, 1949 |
| 2,510,523 | Schiavi | June 6, 1950 |

FOREIGN PATENTS

| | | |
|---|---|---|
| 354,311 | Great Britain | Aug. 4, 1931 |

OTHER REFERENCES

"Gem" Rotary Hoe, a book published by Rotary Hoes Ltd., East Horden, Essex, England, published prior to May 23, 1949, pages 11, 17, 32 and 34.